Sept. 29, 1970          W. C. ALBERT          3,530,727

LIQUID METAL SUPPORT (LMS) ACCELEROMETER

Filed July 19, 1967

*INVENTOR.*
WILLIAM C. ALBERT
BY
ATTORNEY

United States Patent Office 3,530,727
Patented Sept. 29, 1970

3,530,727
LIQUID METAL SUPPORT (LMS) ACCELEROMETER
William C. Albert, Waldwick, N.J., assignor to Singer-General Precision, Inc., Little Falls, N.J., a corporation of Delaware
Filed July 19, 1967, Ser. No. 654,420
Int. Cl. G01p *15/08*
U.S. Cl. 73—516                    6 Claims

ABSTRACT OF THE DISCLOSURE

An accelerometer adaptable to force balance operation wherein a proof mass of preferably ceramic material is supported within a housing by pads of liquid of high surface tension. The pads have sufficient resiliency due to surface tension to prevent relative transverse motion between proof mass and enclosure. To prevent relative rotation, the surface of the proof mass adjacent to the pad is concaved or otherwise contoured and the interior of the enclosure is longitudinally grooved to receive the pads whereby relative rotation would result in compression of the liquid of the pad.

BACKGROUND OF THE INVENTION

This invention relates to inertial apparatus and more particularly to the bearing suspension of proof masses in accelerometers useful to indicate the forces of acceleration applied to an object.

Accelerometers are very useful particularly in navigation systems for aircraft, guided missiles and the like vehicles. Many very effective, accurate accelerometers have been devised which utilize a seismic or proof mass responsive to acceleration to produce a force proportional to its mass and the acceleration applied. In such accelerometers, the ultimate to be desired is for the proof mass to be free of all other forces and influences besides the forces of acceleration. This ultimate is not realizable, among other reasons, because the means for supporting the proof mass inherently applies some force to the proof mass.

A common support means for proof masses in accelerometers is the metal hinge which has been quite successful. However, even hinges present a certain amount of resistance to bending whereby some of the force of acceleration is required to overcome this resistance before the proof mass is moved.

In addition to the resistance to bending presented by the hinge, it also presents a problem in stability, particularly null stability. It is, of course, desirable in a force rebalance system that after a proof mass has been deflected, in its unaccelerated condition, it returns to its initial or null position. This often is not the case with hinge supported proof masses but rather due to bending of the hinge, the proof mass returns to a position of slight displacement from null. That is, the system does not have perfect null stability.

While present accelerometers have been perfected to unusually good accuracies despite some of the failings of the same, the present-day and foreseeable advances in other aspects of technology such as space travel and the like, require comparable advances and increases in accuracy in navigation systems. Wherein these systems employ accelerometers, advances in the accelerometers themselves are required.

In accordance with this invention, an accelerometer is provided wherein a proof mass is supported within an enclosure by pads of liquid metal at locations about the periphery of the proof mass and at axially spaced locations. The surface of either the proof mass or the interior surface of the enclosure is concaved or otherwise contoured and the interior surface of the other of these components is axially grooved to receive the pad. Thus, the pad is compressed in response to relative rotation between the proof mass and enclosure whereby the pads so disposed are cooperative with the concavities and groove to resiliently restrain relative rotation. Thus, the pads by their inherent surface tension maintain a spacing between proof mass and enclosure at any one location and by the circumferential and axial spacing of pads, the proof mass and enclosure are maintained uniformly spaced throughout.

The liquid pads have virtually no static friction and extremely low moving friction whereby the suspension provides extremely low resistance to movement of the proof mass axially with respect to the enclosure. The liquid pad exhibits no fatigue and the accelerometer therefore presents no problem whatsoever in null stability.

To accommodate for changes in volume of liquid pads due to changes in temperature, the proof mass and enclosure materials are selected so that their relative temperature expansion coefficients are interrelated with the liquid pad thickness and expansion characteristics so as to cause the volume of the pad cavity to expand with temperature at the same rate as the liquid metal volume. In this way, the expansion of the liquid pad with increasing temperature is compensated for.

Accordingly, it is a principal object of this invention to facilitate the low friction support of a proof mass in an accelerometer and to utilize the inherent surface tension characteristics of liquid metal to prevent relative rotation between a proof mass and other accelerometer components.

Other objects and many additional advantages will be more readily understood by those skilled in the art after a detailed consideration of the following specification taken with the accompanying drawings.

Figure 1:
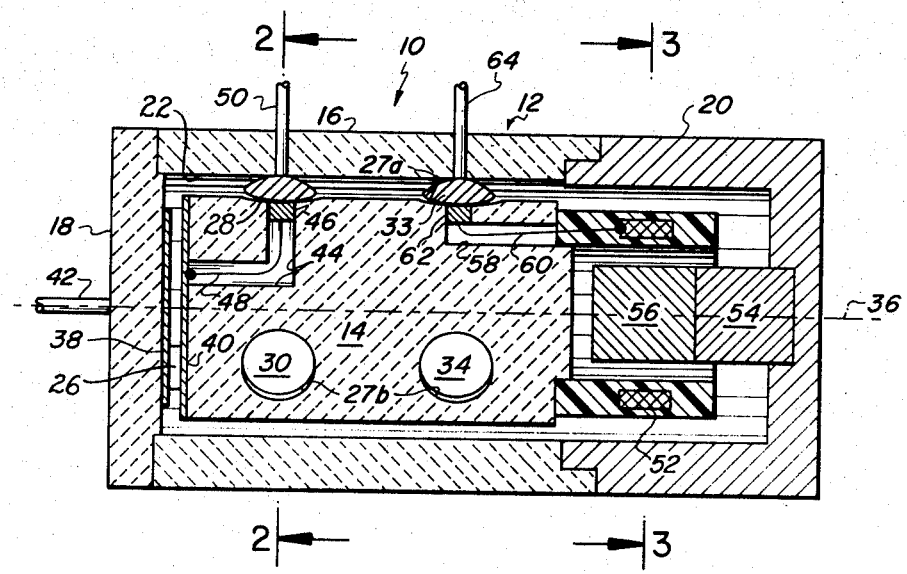
FIG. 1 is a cross section of one embodiment of the invention.

Referring now to the drawings for a detailed description of the invention, in FIGS. 1, 2, and 3, 10 represents generally the entire accelerometer according to this invention having as principal components an enclosure 12 and a proof mass 14. Enclosure 12 comprises a tubular section 16 preferably made of some suitable ceramic material or quartz which is inert to and non "wetting" with respect to the liquid metal, an end portion 18 made of the same ceramic or quartz and another tubular and end portion 20 made of some magnetizable material. These parts are hermetically sealed at their respective junctions in some suitable manner.

Figure 2:
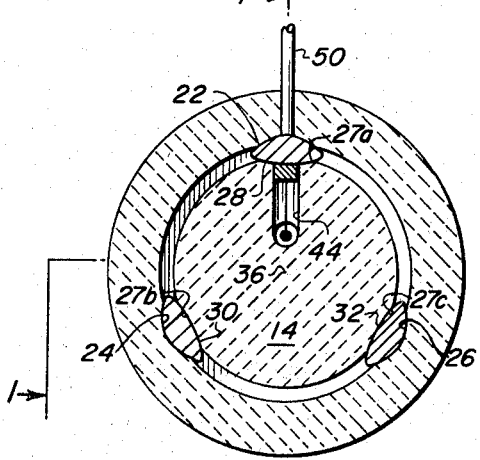
FIG. 2 is a cross section view taken on lines 2—2 of FIG. 1.
Figure 3:
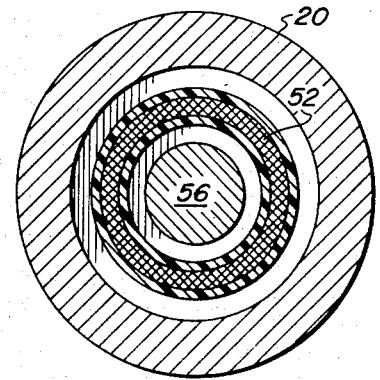
FIG. 3 is a cross section view taken on lines 3—3 of FIG. 1.

As shown in FIG. 2 of the drawings, the interior of enclosure 12 may be generally round, although other shapes may be equally well adapted, and is provided with three equally circumferentially spaced axially extending troughs or grooves as shown at 22, 34, and 26. Similarly, the proof mass 14 is provided with three equally circumferentially spaced cavities or flattened areas such as 27a, 27b, and 27c at each of a pair of axially spaced locations. Disposed in these cavities and abutting the trough portions of the enclosure, are pads of liquid metal designated 28, 30, and 32 at one axial location and a similar plurality of pads at another axial location, only two of which latter may be seen at 33 and 34, for example, in FIG. 1. It is to be understood that while the disposition of the supporting pads is shown as being circumferentially equidistant, it is within the purview of this invention to dispose these pads in other than equidistant spacings, however, to maintain appropriate radial spacing between proof mass and enclosure.

These pads are shown considerably enlarged and possess adequate surface tension to prevent extrusion thereof under cross accelerations transverse to the acceleration axis 36. Also, the liquids are inert and non-wetting to the material of which both the enclosure 12 and the proof mass 14 are made to prevent diminution of the liquid resistance to movement of proof mass or formation of interfering compounds.

It should be particularly noted that the pads such as 28, 30, and 32 by their inherent nature permit movement of proof mass 14 axially relative to enclosure 12 without resistive friction forces since the static friction of newtonian metal liquids are virtually zero and moving friction is very small. Accordingly, along the acceleration axis, the only significant forces applied to the proof mass are the forces of acceleration resulting in much greater accuracy of the accelerometer.

As an important feature of this invention, the supporting pads and construction of proof mass 14 and enclosure 12 inherently maintain circumferential alignment of the proof mass and enclosure. In the circumferentially aligned condition of proof mass and enclosure, that is, without any relative rotation between these components, the pads are most nearly round or have the lowest surface to volume ratio. On the other hand, in response to relative rotation between proof mass and enclosure, the pads become progressively more flattened and squashed, increasing the ratio of surface area to volume. According to well-known physical principles, this increases the potential energy of the pads and since all systems tend to assume conditions of lowest potential energy, the action of the pad is to tend to assume its most nearly round condition or the condition of lowest surface area to volume ratio. Thus, the pads exert a torque force on the proof mass and enclosure, tending to restore them to their relatively nonrotated positions. Accordingly, the pads in cooperation with proof mass and enclosure, serve to support these components in spaced relationship, provide for friction-free relative axial movement therebetween and further, they maintain these components in circumferential alignment with respect to each other.

The accelerometer 10 is adapted for operation over relatively wide temperature ranges without adverse effects. To maintain proper support by the pads, the materials of proof mass 14 and enclosure 12 are selected to have coefficients of expansion which allow the spacing between enclosure and proof mass to expand. Accordingly, any expansion of the pads is readily accommodated or in the worst situation, any excess of expansion of the pad over expansion of the enclosure 12, for example, is accommodated simply by some enlargement of the pad. The cavities such as 22, 24, and 26 are proportioned so as to allow for such excess expansion.

The movement of proof mass 14 axially relative to enclosure 12 is sensed capacitatively. To this end, a conductive capacitor plate 38 is applied to the interior of end portion 18 and a capacitor plate 40 is secured to the end of proof mass 14. Clearly as the proof mass 14 moves axially relative to the enclosure 12, these plates 38 and 40 move correspondingly relative to each other and the capacitance of the capacitor formed by these plates is varied. In accordance with known practice, this change in capacitance can be utilized in an electrical bridge or other circuit means to provide an output potential of a magnitude indicative of the relative axial spacing between proof mass 14 and enclosure 12. Exterior electrical connection to plate 38 is made by a conductive lead 42 extending through end portion 18.

According to still another feature of this invention, the liquid pads such as 28, 30, 32 and 33 are conductive and facilitate electrical connection from the exterior of accelerometer 10 to interior elements without imposing drag or other resistive forces on the proof mass. Thus, a bipartite hole 44 is provided in proof mass 14, which extends from cavity 27a to plate 40. An electrical conductive plug 46 is provided to close the end of hole 44 at cavity 27a and an electrical lead 48 extends from contact with plug 46 to plate 40. Pad 28 is in contact with plug 46 and an electrical lead 50 extends from an exterior location through the wall of the tubular section 16. Since pad 28 is in contact with the interior of tubular section 16 at this location, the external electrical connection to capacitor plate 40 is completed. Of course, the axial extent of pad 28 is sufficiently great that both axial extremities of movement of proof mass 14 with respect to enclosure 12, the electrical contact between lead 50 and the pad 28 is maintained.

For facilitating force balancing on proof mass 14, an electromagnetic force balancing apparatus is provided and includes an electrical winding 52 mounted on and surrounding an axial extension of potting of proof mass 14 and a permanent magnet 54 extending axially inwardly of the enclosure 12 from end portion 20. This construction is quite analagous to that used in permanent magnet speakers. An extension 56 of magnet 54 is made of magnetizable material whereby extension 56 and end portion 20 serve to provide a return path for lines of magnetic flux emanating from magnet 54.

External connections to winding 52 are facilitated by another hole 58 in proof mass 14 and a conductive lead 60 extending from one end of winding 52 to a plug 62 closing the end of hole 58 and contacting pad 33. Exterior connection is enabled by a conductive lead 64 extending through the wall of tubular section 16 and contacting pad 33.

In a well-known manner, the electrical potentials derived from a circuit including capacitor 38–40 may be applied to winding 52 whereby the reaction of the flux produced by this winding against the flux of permanent magnet 54 produces a force on the proof mass 14. Such a force may be controlled in both direction and magnitude to balance the force of acceleration on the proof mass and restore the proof mass to its null position.

The interior of enclosure 12, other than the space occupied by the apparatus described hereinabove, is filled with an inert gas or liquid.

Figure 4:
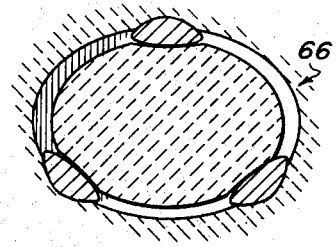
FIG. 4 is a cross section view showing a variation in the mass shape and bearing structure.

In accordance with another aspect of this invention, the cross sectional configuration of proof mass and interior of enclosure may be other than generally a right-circular cylinder. These components may be non-circular cylinders such as of square, triangular or even elliptical cross section as shown at 66 in FIG. 4 of the drawing. In these alternative configurations, the forces preventing relative rotation may be even greater than in the circular cylinders. Of course, the term "cylinder" is herein used in its true rather than colloquial sense, namely, a closed geometric figure produced by a straight line generatrix always moving parallel to another straight line. Thus, figures of rectangular or other cross sections are included.

While the present invention has been described in preferred embodiments, it will be obvious to those skilled in the art that various modifications can be made therein within the scope of the invention, and it is intended that the appended claims cover all such modifications.

What is claimed is:

1. An accelerometer comprising a pair of elements including an enclosure portion having an interior and a proof mass within said enclosure, said proof mass having an elliptical cross section configuration corresponding to that of the interior of said enclosure, and means supporting said proof mass in spaced relationship with respect to said enclosure, said supporting means including a plurality of peripherally spaced concavities in one of said elements, a corresponding plurality of peripherally spaced longitudinal grooves in the other of said elements, and a plurality of liquid metal pads interposed between said proof mass and enclosure, each one of said pads being seated between one of said concavities and a corresponding longitudinal groove respectively.

2. An accelerometer according to claim 1 wherein said supporting means additionally comprises a second plurality of peripherally spaced liquid pads wherein said first and second pluralities of pads are at axially spaced locations.

3. An accelerometer according to claim 2 wherein each of said grooves is in alignment with corresponding ones of said pads in said first and second pluralities.

4. An accelerometer according to claim 1 wherein said pads are electrically conductive and said enclosure portion and proof mass are nonconductive, additionally comprising a pair of conductive plates substantially parallel and respectively mounted on said enclosure and proof mass, an electrical connection between the plate on said proof mass and one of said pads and an electrical lead extending from the exterior of said enclosure through the enclosure into contact with said one of said pads.

5. An accelerometer according to claim 1 wherein said enclosure portion and said proof mass are nonconductive and additionally comprising a pair of conductive plates substantially parallel to each other and mounted respectively on said enclosure and said proof mass, an electrical coil and a magnet having flux coupling said coil whereby said coil is energizable by signals proportional to movement of said proof mass away from a null position to restore the same to its null position.

6. An accelerometer according to claim 1 wherein the coefficient of expansion of the enclosure exceeds the coefficient of expansion of the proof mass in a proportion to accommodate expansion of the pads therebetween in response to temperature change.

References Cited

UNITED STATES PATENTS

| | | | |
|---|---|---|---|
| 2,852,243 | 9/1958 | Shepard | 73—517 |
| 2,869,851 | 1/1959 | Sedgfield et al. | |
| 2,943,493 | 7/1960 | Ten Bosch et al. | |
| 2,958,137 | 11/1960 | Mueller. | |
| 2,980,473 | 4/1961 | Tanis | 308—240 XR |
| 3,178,937 | 4/1965 | Bradley. | |
| 3,262,744 | 7/1966 | Thomas | 308—240 |

JAMES J. GILL, Primary Examiner